Patented June 17, 1947

2,422,276

UNITED STATES PATENT OFFICE 2,422,276

COMPOUNDED LUBRICATING OIL

Louis A. Mikeska, Westfield, N. J., assignor to Standard Oil Development Company, a corporation of Delaware No Drawing. Application September 14, 1943, Serial No. 502,299

6 Claims. (Cl. 252—45)

This invention relates to a method of preventing the deterioration of organic materials, and it relates more particularly to a new type of additive for improving the properties of mineral lubricating oils.

More particularly, the invention relates to lubricating oil additives prepared from sulfur halides and unsaturated materials. When olefinic materials of more than four carbon atoms are treated with sulfur chloride, products containing both sulfur and chlorine are obtained which are oil soluble but which are not desirable because of their unstable character. For example, a product made by reacting diisobutylene with sulfur monochloride will be found to be unstable and will slowly give off hydrochloric acid even after long periods of standing. An attempt to stabilize the material by mere heating results in precipitation of sulfur from the compound. Such a product is obviously not suitable for use in lubricating oils because of its corrosive nature.

In accordance with the present invention a sulfur halide is reacted with an unsaturated compound, preferably one of higher molecular weight than the gaseous olefins, and the reaction product is further reacted with a phenol containing a long aliphatic side chain, preferably a wax chain, or a related product such as a wax substituted naphthol, or a salt or ester of such compound, to produce a material which is not only not corrosive when used as an additive for lubricating oils, but also has the property of inhibiting the normal corrosiveness of such oils toward copper-lead and similar bearings now widely used in automotive engines, and has the further property of reducing the pour point of waxy lubricating oils normally having a high pour point. One of the functions of the phenolic compound is to stabilize the sulfur present in the reaction product of the sulfur halide with the olefinic compound. Although all or a greater part of the halogen present is removed by the second reaction as hydrogen halide, the aromatic compound does not act merely as a dehydrohalogenating agent but actually enters into the reaction and becomes a constituent of the final reaction product. The resulting material is believed to possess an aromatic ring structure with an alkyl side chain containing sulfur in a stabilized form.

The final reaction products of the above described series of reactions not only reduce the corrosion of alloy bearings when blended with lubricating oils, but also notably improve engine cleanliness and reduce ring sticking, piston skirt varnish and sludging tendencies of oils used in automotive engines.

In the first reaction of the process any sulfur halide may be reacted with a compound containing one or more unsaturated carbon-to-carbon linkages, e. g., a C=C group, either in a straight or branched chain or in a cyclic compound other than an aromatic nucleus. Thus, amylene, butylene, isobutylene, diisobutylene, triisobutylene, the codimer of isobutylene and normal butylene, cracked gasoline fractions, cracked paraffin waxes, viscous olefin polymers, such as medium or high molecular weight polybutylene, cyclohexene, cyclopentene, butadiene, pentadiene, isoprene, styrene, oleic acid, oleyl alcohol, pine oil, terpenes and similar unsaturated materials may be used. Likewise the reaction may be applied to compounds having acetylenic linkages, C≡C. Olefins of less than four carbon atoms are in general not considered suitable for the present invention, although it is not intended that their use be excluded. Derivatives of the above described compounds containing various substituent groups and atoms may also be used to advantage, since the substituent groups normally do not interfere with the principal reaction. The most suitable sulfur halides are sulfur dichloride and monochloride, especially the latter. The olefinic material and sulfur halide may be reacted in any desired proportions, but the most preferred ratio of olefinic material to sulfur halide is within the range of about 3:1 to 1:1 molal ratio. Higher ratios often may be used when a portion of the olefinic material is to serve as a solvent to be removed later as unreacted material. The temperatures which have been found most satisfactory for this reaction are from about 20° to about 50° C. (about 70°–125° F.), but the reaction may be carried out at considerably higher or lower temperatures if desired. Catalysts are not required.

In the second step of the process, in which the reaction product of sulfur halide and an olefin or like material is further reacted with an alkylated phenol or like compound, a ratio of about 1 part by weight of phenolic material to ½ to 10 parts by weight of sulfur halide-olefin reaction product may be used. With wax-alkylated phenols the ratios may be more clearly defined if expressed in terms of the molecular equivalents of alkyl phenol and of the atomic equivalents of chlorine in the sulfur halide-olefin complex. The most desirable products are obtained if a ratio of from ½ to 1½ molecular equivalents of wax-alkylated phenol are used for each atomic equivalent of chlorine in the olefin-sulfur halide complex. It will often be found advantageous to employ an excess of wax phenol over that theoretically required in order to bring about complete reaction. Any unreacted wax phenol can later be removed from the product by suitable means such as solvent extraction, using, for example, 5 to 10% potassium hydroxide in 60 to 75% aqueous methanol at about 80–120° F. The temperature of the reaction may range from about 40° to about 160° C. (about 100°–320° F.), but the more desirable range has been found to be between about 80° and about 140° C. (about 175°–285° F.).

In general, solvents are not required in either the first or second steps of the process because of the nature of the reactants employed. For example, when diisobutylene is used as the olefin source, any excess of this which is present undoubtedly acts in a solvent capacity. In cases where olefinic material of higher molecular weight is used or where the reaction mixture is not sufficiently fluid the reaction may be aided by the use of an organic solvent such as a chlorinated hydrocarbon or the like. Also, with some types of reactants the presence of water, alcohol or ether will be found to be beneficial.

The phenolic type materials which may be used in the process include aromatic materials having single or multiple ring nuclei and one or more hydroxyl groups, or a similar group in which the hydrogen has been substituted by a metal of groups II, III, IV or VIII of the periodic table or by an ester group RCO—, where R is an aliphatic radical, and where the aromatic nucleus has an aliphatic side chain consisting essentially of an alkyl grouping having at least 20 carbon atoms. The alkyl side chain is preferably derived from a paraffinic or ester wax. The preferred compounds are the wax alkylated phenols, cresols, naphthols, resorcinols and the like, and their salts and esters, although compounds containing substituent atoms or groups, such as halogen atoms, amino groups, carboxyl groups, alkoxy groups, acyl groups, ester groups and other alkyl groups may also be employed. It may be mentioned that wax alkylated salicylic and alkyl salicylic acids and their esters are particularly useful, since they impart effective extreme pressure properties to the additive. The aliphatic esters of wax alkylated phenols are also valuable because of their usefulness in imparting extreme pressure properties and pour depressing properties to the additives. It is to be understood also that the phenolic acompounds include the phenol sulfides obtained by reacting the wax phenols with a sulfurizing agent, such as a sulfur chloride. These phenol sulfide compounds are known to be useful in themselves as anticorrosion agents, and their usefulness is increased by reacting them or their metal salts with the sulfur halide products of the present invention to form products containing additional sulfur in stabilized form.

It is to be understood that the long side chain group which appears in the phenolic compound, and which is preferably derived from a petroleum wax or an ester wax, may be attached in various ways to the aromatic nucleus. For example, one or more wax groups may be attached to each aryl group, or several aryl groups may be attached to one wax group at several points along the chain. For example, when long chain alkyl groups are introduced into the compounds, as by alkylation with halogenated paraffin wax, mono-halogenated wax tends to give alkylated phenols of the following types:

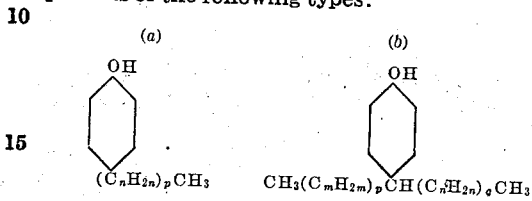

in which $m$, $n$, $p$ and $q$ are integers. However, if poly-halogenated wax is used, it is possible for two or more phenol groups to be attached to the same alkyl chain as follows:

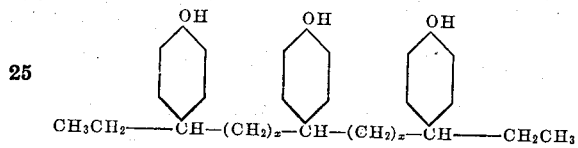

where $x$ is 0 or an integer. It is to be understood that there may be more than one wax chain attached to the same nucleus.

In general, the preferred method of conducting the reactions of the present invention is first to treat the olefin or like material with the sulfur halide and then to follow this reaction by subsequent treatment with the aromatic material. However, variations of this procedure may be employed, as by adding the sulfur halide to a mixture of the olefin and aromatic material, provided the olefin and aromatic material do not react directly with each other.

If desired, the reaction products of the present invention may be further treated. For example, they may be converted to metal salts such as those of tin, barium, calcium, zinc, magnesium, nickel or aluminum and the metal derivatives used as lubricating oil additives. Likewise, any free phenolic groups present may be converted to ester or ether groups and the products used as additives.

One of the noteworthy advantages of the additives prepared in accordance with the present invention is their ability to reduce exhaust valve sticking in engine operation. In certain types of service, such as in railway Diesel engines, oils of otherwise satisfactory characteristics are often objectionable because of their tendency to cause sticking or erratic action of exhaust valves, presumably through the building up of oil decomposition products on the hot portions of the valve stems. Additives of the present invention markedly reduce this tendency in oils in which they are blended. Since fuel combustion products also come into contact with the valve parts, the additives may likewise be added to the fuels for both Diesel and gasoline engines to prevent or minimize the sticking of valves.

It is to be understood, however, that reduction in valve sticking is by no means the only advantage to be gained in using these additives. As noted above, the additives also bring about reduced corrosiveness toward alloy bearings and impart engine cleanliness as indicated by the decreased quantities of deposits found in ring grooves, on piston skirts and on other parts of the engine in which the compounded lubricants are used. Also, as noted above, the additives contribute pour depressing properties to oils of a waxy type which possess normally relatively high pour points. Furthermore, many of the additives exhibit film strength improving properties and their use in extreme pressure lubricants is accordingly contemplated in the present invention.

Generally, the additives of the present invention are most advantageously blended with the lubricating oil base stocks in concentrations between the approximate limits of 0.02% and 5.0%, and preferably from 0.1% to 2.0%, although larger amounts may be employed. The exact amount to be used depends to some extent on the particular compounds used, the character of the mineral oil base and the operating conditions of the engine in which the lubricant is to be employed. When the additives are to be used in extreme pressure lubricants, concentrations of 1% to 15% are desirable and concentrations of 2% to 10% are preferred.

Concentrates of the additives and oil may also be prepared in, say, 25% to 75% concentration of additive and the concentrate later blended with other oils to give a final blend of the lubricating oil containing the desired percentage of additive. Such concentrates are often desirable to save shipping weight and space and to facilitate blending operations.

The preparation and testing of additives used in accordance with the present invention are illustrated in the following examples.

Example 1

A wax phenol was prepared by reacting 500 grams of wax containing 12.83% chlorine (derived from a paraffin wax of 118° F. melting point) and 85 grams of phenol in the presence of 15 grams of aluminum chloride. The reaction took place at 65° C. and the mixture was then heated to 150° C. for 3 hours. The product was then taken up in naphtha, washed, dried and the solvent removed. Excess wax was removed by distillation up to 280° C. B. P. at 1-3 mm. The product had an acetyl number of 57.6 mg. KOH/g. acetylated product. This corresponds to a molecular weight of about 958 or about 3 wax molecules per phenol nucleus. Analysis of wax phenol: 82.59% carbon, 12.43% hydrogen, 0.42% chlorine.

Example 2

A condensate of sulfur chloride and diisobutylene was prepared by adding 1 molecular proportion of sulfur monochloride to about 2 molecular proportions of diisobutylene at about 40° C., then heating at 100° C. for 3 hours, distilling with steam, taking up the product with petroleum ether, drying and removing the solvent in vacuo. The product was found to contain 8.15% of chlorine and 25.8% of sulfur.

Example 3

A product was prepared as in Example 2, except that 1 molecular proportion of sulfur monochloride was reacted with about 1 molecular proportion of diisobutylene. The final product contained 11.58% chlorine and 33.75% sulfur.

Example 4

Each of the products of Examples 2 and 3 was reacted with the wax phenol prepared as in Example 1 but using a ratio of about 3 molecular equivalents of wax phenol for each 4 atomic equivalents of chlorine in the diisobutylene/sulfur chloride condensate. The reactants were mixed and heated on a steam bath, but since hydrogen chloride was still being evolved after 2 days, the mixture was placed in a suction flask and heated another 3 days at about 100 mm. pressure and with a bubbler to help sweep out the hydrogen chloride. The products showed the following analysis:

|  | Product from Example 2 Material (Product A) | Product from Example 3 Material (Product B) |
| --- | --- | --- |
|  | Per cent | Per cent |
| Chlorine | 1.91 | 1.38 |
| Sulfur | 10.54 | 9.97 |

Example 5

The products prepared as described in Example 4 were allowed to stand until the sludge had settled and then filtered from the sludge. The pour points of blends of the product in a refined clay finished Pennsylvania neutral lubricating oil of 44 seconds viscosity (Saybolt) at 210° F. and 100 V. I. were determined and compared with the pour point of the unblended base oil. The results were as follows:

| Oil Blend | Pour Point, ° F. |
| --- | --- |
| Base Oil | +30 |
| Base Oil+0.5% Product A | −15 |
| Base Oil+0.5% Product B | −20 |

Example 6

Blends of the products prepared by the method of Example 4 in a lubricating oil base consisting of a well refined solvent extracted paraffinic type mineral lubricating oil of S. A. E. 20 viscosity grade, each blend containing 0.5% of the additive, and a sample of the unblended base oil, were submitted to a corrosion test designed to measure the effectiveness of the products in inhibiting the corrosiveness of a typical mineral lubricating oil toward the surface of copper-lead bearings. The test was conducted as follows:

500 cc. of the oil were placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed and were washed with naphtha and weighed to determine the amount of loss by corrosion. The bearings were then repolished (to increase the severity of the test), reweighed, and then subjected to the test for additional four-hour periods. The cumulative weight losses of all the bearings used in a given test at the end of the various four-hour periods are given in the table.

Table

| Additive | Cumulative Bearing Weight Loss (mg. per 25 sq. cm. surface) | | | |
|---|---|---|---|---|
| | 4 | 8 | 12 | 16 |
| Base Oil | | 181 | | |
| Base Oil +0.5% Product A | 5 | 0 | 4 | 7 |
| Base Oil +0.5% Product B | 0 | 0 | 0 | 4 |

It will be seen that both products were very effective in inhibiting the corrosiveness of the oil toward copper-lead bearings.

Not only do the additives of the present invention improve the tendency of lubricating oils in which they are blended to promote engine cleanliness, but they also enhance the desirable features of other detergent additives, particularly the metal soaps, metal phenates, metal alcoholates, metal phenol sulfides, metal mahogany sulfonates, metal alkylphenol sulfonates, metal organo phosphates, thiophosphates and thiophosphites, and the like. Thus, they may be blended in oils together with such other additives, such as calcium octadecylate, barium tert.-octyl phenate, zinc diisopropyl salicylate, zinc tert.-octyl phenol sulfide thiophosphate, calcium dichlorostearate, barium diamyl phenol sulfide, barium tert.-octyl phenol sulfide, calcium mahogany sulfonate, magnesium cetyl phenate, barium dioctyl dithiophosphate, magnesium lauryl salicylate, nickel amyl xanthate, tin lauryl dithiocarbamate, zinc lauryl mercaptide, and the like.

The lubricating oil base stocks employed in the blended lubricating oils of this invention may be straight mineral lubricating oils, or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also, for special applications, animal, vegetable or fish oils or their hydrogenated or voltolized products may be employed, either alone or in admixture with mineral oils.

For the best results the base stock chosen should normally be that oil which without the new additives present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed Diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of Diesel service, particularly with high speed Diesel engines, and in gasoline engine service, oils of higher viscosity index are often required, for example up to 75 or 100, or even higher viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Solvents and assisting agents, such as esters, ketones, alcohols, aldehydes, halogenated or nitrated compounds and the like, may also be employed.

Assisting agents which are particularly desirable are the higher alcohols having eight or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc., In addition to being employed in crankcase lubricants and in extreme pressure lubricants, the additives of the present invention may also be used in industrial lubricants, process oils, engine flushing oils, turbine oils, insulating and transformer oils, steam cylinder oils, slushing and rust preventive compositions, and greases. Also their use in motor fuels, Diesel fuels and kerosene is contemplated. Since these additives exhibit anti-oxidant properties and are believed also to possess ability to modify surface activity, they may be employed in asphalts, road oils, waxes, fatty oils of animal or vegetable origin, soaps, and plastics. Similarly, they may be used in natural and synthetic rubber compounding both as vulcanization assistants and as antioxidants, and generally they may be used in any organic materials subject to deterioration by atmospheric oxygen.

The present invention is not to be considered as limited by any of the examples described herein, which are given by way of illustration only, but is to be limited solely by the terms of the appended claims.

I claim:

1. A liquid hydrocarbon product consisting essentially of a mineral oil and 0.02% to 15% of a product obtained by reacting from about 1 to about 3 molecular proportions of a compound selected from the group consisting of aliphatic and alicyclic compounds containing an unsaturated carbon-to-carbon linkage, at a temperature of 20° to 100° C., with 1 molecular proportion of a sulfur halide, and further reacting from ½ to about 10 molecular proportions of the product thus formed, at a temperature of about 40° to about 160° C. with a compound of the formula R—Ar—OT where Ar is an aromatic nucleus, R represents at least one aliphatic side chain consisting essentially of an alkyl group having at least 20 carbon atoms, and T is a member of the group consisting of hydrogen and metal equivalents of hydrogen, the metals being those of groups II, III, IV and VIII of the periodic table.

2. A lubricant consisting essentially of a mineral lubricating oil base and 0.02% to 15% of a product obtained by reacting from about 1 to about 3 molecular proportions of a compound selected from the group consisting of aliphatic and alicyclic compounds containing an unsaturated carbon-to-carbon linkage, at a temperature of 20° to 100° C., with 1 molecular proportion of a sulfur halide, and further reacting from about ½ to about 10 molecular proportions of the product thus formed, at a temperature of about 40° to about 160° C. with a compound of the formula R—Ar—OT where Ar is an aromatic nucleus, R represents at least one aliphatic side chain consisting essentially of an alkyl group having at least 20 carbon atoms, and T is a member of the group consisting of hydrogen and metal equivalents of hydrogen, the metals being those of groups II, III, IV and VIII of the periodic table.

3. A lubricant consisting essentially of a mineral lubricating oil base and 0.02% to 15% of a product obtained by reacting about 1 to about 3 molecular proportions of an olefin with 1 molecular proportion of a sulfur chloride at a temperature of 20° to 100° C., and further reacting, at a temperature of about 40° to about 160° C., about ½ to about 10 molecular proportions of the product thus formed with 1 molecular proportion of a compound of the formula R—Ar—OT where Ar is an aromatic nucleus, R represents at least one aliphatic side chain consisting essentially of an alkyl group having at least 20 carbon atoms, and T is a member of the group consisting of hydrogen and metal equivalents of hydrogen, the metals being those of groups II, III, IV and VIII of the periodic table.

4. A lubricant according to claim 3 in which the olefin is a polymerized derivative of isobutylene and the aromatic compound is wax-phenol.

5. A lubricating oil concentrate consisting essentially of a mineral lubricating oil base stock and from about 25% to about 75% of a product obtained by reacting about 1 to about 3 molecular proportions of an olefin with 1 molecular proportion of a sulfur chloride at a temperature of 20° to 100° C., and further reacting, at a temperature of about 40° to about 160° C., about ½ to about 10 molecular proportions of the product thus formed with 1 molecular proportion of a compound of the formula R—Ar—OT where Ar is an aromatic nucleus, R represents at least one aliphatic side chain consisting essentially of an alkyl group having at least 20 carbon atoms, and T is a member of the group consisting of hydrogen and metal equivalents of hydrogen, the metals being those of groups II, III, IV and VIII of the periodic table.

6. An extreme pressure lubricant consisting essentially of a mineral lubricating oil base stock and 2% to 10% of a product obtained by reacting about 1 to about 3 molecular proportions of an olefin with 1 molecular proportion of a sulfur chloride at a temperature of 20° to 100° C., and further reacting, at a temperature of about 40° to about 160° C., about ½ to about 10 molecular proportions of the product thus formed with 1 molecular proportion of a compound of the formula R—Ar—OT where Ar is an aromatic nucleus, R represents at least one aliphatic side chain consisting essentially of an alkyl group having at least 20 carbon atoms, and T is a member of the group consisting of hydrogen and metal equivalents of hydrogen, the metals being those of groups II, III, IV and VIII of the periodic table.

LOUIS A. MIKESKA.

REFERENCES CITED

The following references are of record in the file of this patent:

UNITED STATES PATENTS

| Number | Name | Date |
|---|---|---|
| 2,263,445 | Reiff | Nov. 18, 1941 |
| 2,313,248 | Lincoln | Mar. 9, 1943 |
| 2,137,410 | Moran | Nov. 22, 1938 |
| 2,167,345 | Crandall | July 25, 1939 |
| 2,296,069 | Talbert | Sept. 15, 1942 |
| 2,239,534 | Mikeska | Apr. 22, 1941 |
| 2,270,183 | Cook | Jan. 13, 1942 |
| 2,335,017 | McNab | Nov. 23, 1943 |
| 2,322,376 | McCleary | June 22, 1943 |